(12) United States Patent
Takeuchi (10) Patent No.: US 12,150,202 B2
(45) Date of Patent: Nov. 19, 2024

(54) WIRELESS COMMUNICATION SERVICE PROVIDED FOR MOBILE TERMINAL THAT COOPERATES WITH VEHICLE

(71) Applicant: Honda Motor Co., Ltd., Tokyo (JP)

(72) Inventor: Yuji Takeuchi, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 384 days.

(21) Appl. No.: 17/691,077

(22) Filed: Mar. 9, 2022

(65) Prior Publication Data

US 2022/0304107 A1 Sep. 22, 2022

(30) Foreign Application Priority Data

Mar. 22, 2021 (JP) ................................. 2021-046950
Jan. 28, 2022 (JP) ................................. 2022-012439

(51) Int. Cl.
*H04W 76/34* (2018.01)
*H04W 12/06* (2021.01)
*H04W 12/47* (2021.01)
*H04W 68/00* (2009.01)
*H04W 76/38* (2018.01)

(52) U.S. Cl.
CPC .......... *H04W 76/34* (2018.02); *H04W 12/06* (2013.01); *H04W 12/47* (2021.01); *H04W 68/005* (2013.01); *H04W 76/38* (2018.02)

(58) Field of Classification Search
CPC ..... H04W 76/34; H04W 76/38; H04W 12/47; H04W 12/06; H04W 68/005
See application file for complete search history.

(56) References Cited

U.S. PATENT DOCUMENTS

| 2015/0222553 | A1* | 8/2015 | Macdonald | H04W 4/40 370/230.1 |
| 2022/0187847 | A1* | 6/2022 | Cella | G06Q 10/06 |
| 2022/0197306 | A1* | 6/2022 | Cella | G06N 3/088 |

FOREIGN PATENT DOCUMENTS

| EP | 2955815 | 11/2016 |
| JP | 2004240655 | 8/2004 |
| JP | 2005086337 | 3/2005 |
| JP | 2005222261 | 8/2005 |
| JP | 2006115002 | 4/2006 |
| JP | 2012526497 | 10/2012 |
| JP | 5592511 | 9/2014 |

(Continued)

OTHER PUBLICATIONS

Office Action of Japan Counterpart Application, with English translation thereof, issued on Jun. 6, 2023, pp. 1-10.

(Continued)

*Primary Examiner* — Mewale A Ambaye
(74) *Attorney, Agent, or Firm* — JCIPRNET (57) ABSTRACT

In response to a vehicle being switched from an IGN OFF state (non-operating state) to an IGN ON state (operating state) in a state in which a mobile terminal has been activated, the use of wireless communication (Wi-Fi communication) by the mobile terminal via a network using an in-vehicle device as a base station can be started. In response to the vehicle being switched from the IGN ON state (operating state) to the IGN OFF state (non-operating state) in the state in which the mobile terminal has been activated, the use of wireless communication (Wi-Fi communication) by the mobile terminal via the network using the in-vehicle device as the base station is stopped.

6 Claims, 5 Drawing Sheets

(56) References Cited

FOREIGN PATENT DOCUMENTS

| | | | |
|---|---|---|---|
| JP | 2016045710 | | 4/2016 |
| JP | 2020123924 | * | 8/2020 |
| JP | 2020195053 | | 12/2020 |
| JP | 2021010150 | * | 1/2021 |
| KR | 20110024144 | | 3/2011 |
| WO | 2014122943 | | 8/2014 |
| WO | 2020241066 | | 12/2020 |

OTHER PUBLICATIONS

"Office Action of China Counterpart Application", issued on Sep. 12, 2024, with English translation thereof, pp. 1-13.

* cited by examiner

WIRELESS COMMUNICATION SERVICE PROVIDED FOR MOBILE TERMINAL THAT COOPERATES WITH VEHICLE

CROSS-REFERENCE TO RELATED APPLICATIONS

This application claims the priority benefit of Japan application serial no. 2022-012439, filed on Jan. 28, 2022, which claims the priority benefit of Japan Application No. 2021-046950, filed on Mar. 22, 2021. The entirety of each of the above-mentioned patent applications is hereby incorporated by reference herein and made a part of this specification.

BACKGROUND

Technical Field

The disclosure relates to a wireless communication system.

Related Art

A technical method has been proposed in which, in which, in a wireless communication system that can be used only when there is a subscriber in a vehicle, if the subscriber is not authenticated within a predetermined time, wireless communication is disconnected according to a timer time (see, for example, Patent Document 1).

A technical method has been proposed in which, when a user connects a terminal to the Internet on a train, the service is started in response to authentication using an ID and a password and is stopped in response to expiration of the password, and the user is billed based on a line usage record (see, for example, Patent Document 2).

A technical method has been proposed in which, when a wireless LAN connects to the Internet via a mobile network and data is transmitted and received therebetween, a prepaid usage fee is collected from the user (see, for example, Patent Document 3).

A technical method has been proposed in which, in a connection method between a terminal owned by a vehicle passenger and a terminal mounted in a vehicle, an authentication server returns whether an authentication request from the terminal is approved, a wireless router disconnects communication if the authentication is not completed within a predetermined time counted by a timer, and the timer is canceled if the authentication is completed within the predetermined time (see, for example, Patent Document 4).

A technical method has been proposed in which, a mobile apparatus operated by a vehicle operator is controlled based on a predetermined policy so that, for example, speed data is equal to or less than a minimum threshold (see, for example, Patent Document 5).

A technical method has been proposed in which, when content is transmitted from a content server to an in-vehicle apparatus, encrypted data is transmitted from a mobile terminal to the in-vehicle apparatus, and the content is restored and reproduced (see, for example, Patent Document 6).

A technical method has been proposed in which, a LAN access point is provided in a car, and when an attribute of a terminal is the driver, simple information (notification of whether it is the driver) that does not interfere with driving is provided (see, for example, Patent Document 7).

PATENT DOCUMENTS

Patent Document 1: Japanese Patent Laid-open No. 2020-195053
Patent Document 2: Japanese Patent Laid-open No. 2005-222261
Patent Document 3: Japanese Patent Laid-open No. 2006-115002
Patent Document 4: WO 2020/241066
Patent Document 5: Published Japanese Translation of PCT Application No. 2012-526497
Patent Document 6: Japanese Patent Laid-open No. 2004-240655
Patent Document 7: Japanese Patent No. 5592511

However, there is room for improvement in the convenience of a wireless communication service provided for a mobile terminal that cooperates with a vehicle.

SUMMARY

A wireless communication system of the disclosure includes a database, a first communication processing element, and a second communication processing element. In the wireless communication system, a wireless communication state via a network of a mobile terminal that uses an in-vehicle device mounted in a vehicle as a base station is controlled by cooperation between the database, the first communication processing element and the second communication processing element. The first communication processing element recognizes mobile terminal information regarding a state of the mobile terminal and then transmits the mobile terminal information to the second communication processing element based on communication with the mobile terminal. The second communication processing element, on condition that the mobile terminal information indicating that the mobile terminal is activated has been received from the first communication processing element, recognizes vehicle information regarding a state of the vehicle and then transmits the vehicle information to the first communication processing element based on communication with the in-vehicle device, and registers the vehicle information in the database. The first communication processing element, on condition that the vehicle information indicating that the vehicle is switched from a non-operating state to an operating state has been received from the second communication processing element, determines whether the same vehicle information has been registered in the database, and, on condition that a result of the determination is affirmative, transmits a communication permission notification to the second communication processing element. The second communication processing element, on condition that the communication permission notification has been received from the first communication processing element, causes the in-vehicle device to function as the base station based on communication with the in-vehicle device.

DESCRIPTION OF THE EMBODIMENTS

The disclosure provides a system capable of improving convenience when a user is given a wireless communication service through a mobile terminal that cooperates with a vehicle.

A wireless communication system of the disclosure includes a database, a first communication processing element, and a second communication processing element. In the wireless communication system, a wireless communication state via a network of a mobile terminal that uses an in-vehicle device mounted in a vehicle as a base station is controlled by cooperation between the database, the first communication processing element and the second communication processing element. The first communication processing element recognizes mobile terminal information regarding a state of the mobile terminal and then transmits the mobile terminal information to the second communication processing element based on communication with the mobile terminal. The second communication processing element, on condition that the mobile terminal information indicating that the mobile terminal is activated has been received from the first communication processing element, recognizes vehicle information regarding a state of the vehicle and then transmits the vehicle information to the first communication processing element based on communication with the in-vehicle device, and registers the vehicle information in the database. The first communication processing element, on condition that the vehicle information indicating that the vehicle is switched from a non-operating state to an operating state has been received from the second communication processing element, determines whether the same vehicle information has been registered in the database, and, on condition that a result of the determination is affirmative, transmits a communication permission notification to the second communication processing element. The second communication processing element, on condition that the communication permission notification has been received from the first communication processing element, causes the in-vehicle device to function as the base station based on communication with the in-vehicle device.

According to the wireless communication system having the above configuration, in response to the vehicle being switched from the non-operating state to the operating state in the state in which the mobile terminal has been activated, the use of wireless communication by the mobile terminal via the network using the in-vehicle device as the base station can be started. Accordingly, the convenience of the wireless communication service can be improved.

In the wireless communication system having the above configuration, preferably, the first communication processing element, on condition that the vehicle information indicating that the vehicle is switched from the operating state to the non-operating state has been received from the second communication processing element, determines whether the same vehicle information has been registered in the database, and, on condition that a result of the determination is affirmative, transmits a communication stop notification to the second communication processing element. The second communication processing element, on condition that the communication stop notification has been received from the first communication processing element, stops the function of the in-vehicle device as the base station based on communication with the in-vehicle device.

According to the wireless communication system having the above configuration, in response to the vehicle being switched from the operating state to the non-operating state in the state in which the mobile terminal has been activated, the use of wireless communication by the mobile terminal via the network using the in-vehicle device as the base station is stopped. Accordingly, the convenience of the wireless communication service can be improved.

In the wireless communication system having the above configuration, preferably, the second communication processing element confirms presence or absence of an abnormality in communication of the mobile terminal via the network based on communication with a communication service server, and upon confirming the presence of the abnormality, confirms a provision status of a communication service for the mobile terminal via the network based on communication with the communication service server.

According to the wireless communication system having the above configuration, if an abnormality has occurred in the wireless communication service by the communication service server, that is, if a problem has occurred in the wireless communication by the mobile terminal via the network using the in-vehicle device as the base station, a situation is confirmed based on communication with the communication service server. Accordingly, since a cause of the abnormality can be investigated and/or eliminated in the communication service server, the convenience of the wireless communication service can be improved.

In the wireless communication system having the above configuration, preferably, the second communication processing element, upon confirming that the abnormality in communication of the mobile terminal via the network is eliminated, coordinates content of the communication service by the communication service server for the mobile terminal included in the mobile terminal information registered in the database with content of the communication service managed by the communication service server.

According to the wireless communication system having the above configuration, if the abnormality in the wireless communication by the mobile terminal via the network using the in-vehicle device as the base station is eliminated, the content of the communication service registered in the database regarding the mobile terminal and the content of the communication service by the communication service server can be coordinated. Accordingly, the occurrence of inconsistency in the content of the communication service before and after the occurrence of an abnormality in the wireless communication by the mobile terminal using the in-vehicle device as the base station is prevented, and thus, the convenience of the wireless communication service can be improved.

In the wireless communication system having the above configuration, preferably, the second communication processing element, upon confirming that the abnormality in communication of the mobile terminal via the network is eliminated, updates the mobile terminal information and the vehicle information registered in the database by mutual communication between the first communication processing element, the second communication processing element, the in-vehicle device, and the communication service server.

According to the wireless communication system having the above configuration, if the abnormality in the wireless communication of the mobile terminal via the network using the in-vehicle device as the base station is eliminated, the mobile terminal information and the vehicle information registered in the database are updated or refreshed. Accordingly, the occurrence of inconsistency between the latest registered content and the actual content of the mobile terminal information and/or the vehicle information before and after the occurrence of an abnormality in the wireless communication through the mobile terminal using the in-vehicle device as the base station is prevented, and thus, the convenience of the wireless communication service can be improved.

In the wireless communication system having the above configuration, preferably, the database stores and retains the mobile terminal information including at least one of a mobile terminal identifier for identifying the mobile terminal and a user identifier for identifying a user of the mobile terminal in association with the vehicle information including at least one of a vehicle identifier for identifying the vehicle and an in-vehicle device identifier for identifying the in-vehicle device.

According to the wireless communication system having the above configuration, by using the identifiers included in each of the mobile terminal information and the vehicle information, the mobile terminal and/or the user thereof as well as the in-vehicle device and/or the vehicle in which the in-vehicle device is mounted, are subjected to authentication. Since the wireless communication service is provided for the mobile terminal by passing the authentication, the convenience and reliability of the wireless communication service can be improved.

(Configuration)

Figure 1:
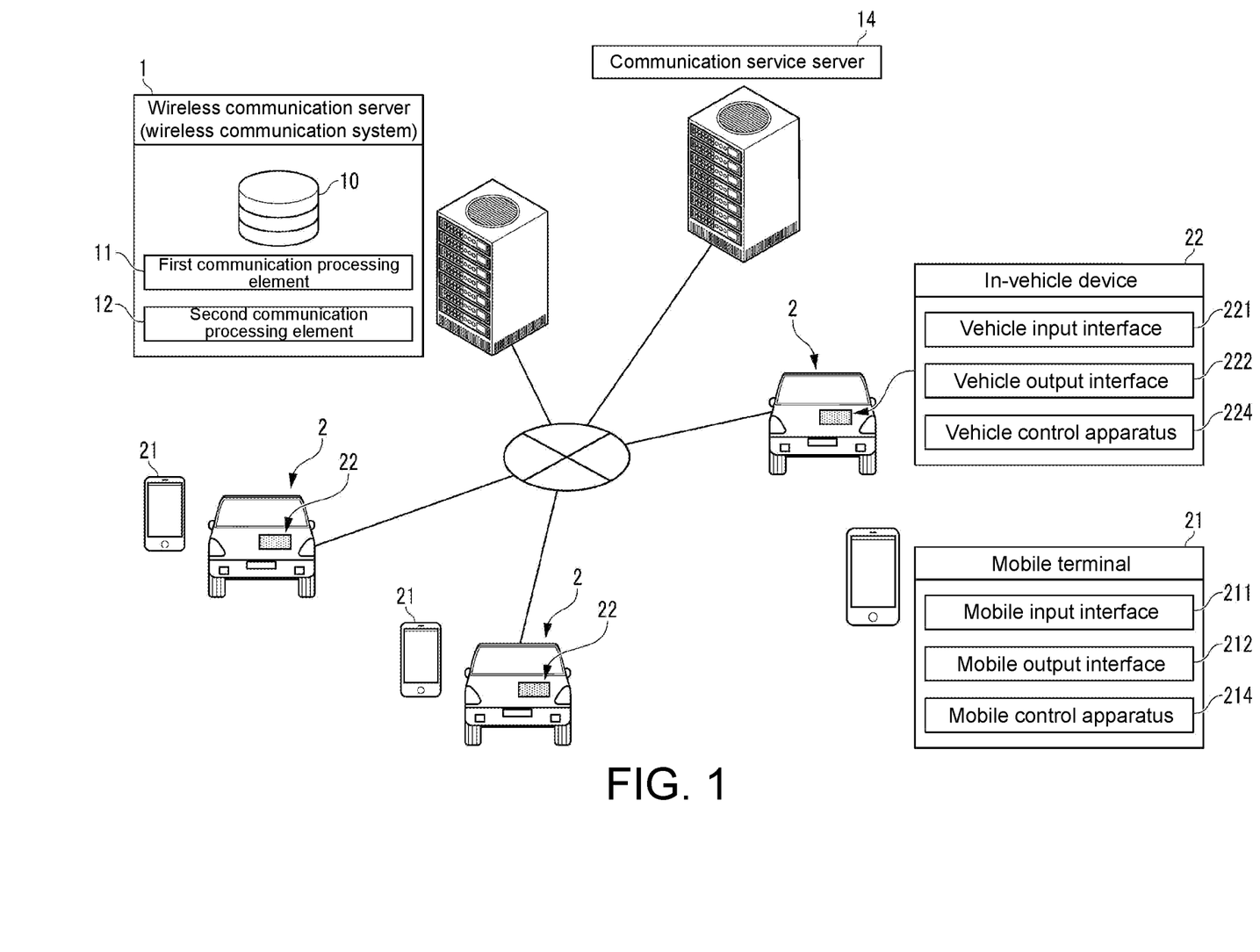
FIG. 1 is an explanatory drawing of a configuration of a wireless communication system as one embodiment of the disclosure.

A wireless communication system as one embodiment of the disclosure shown in FIG. 1 is composed of a wireless communication server 1 that is able to communicate with each of a communication service server 14, a mobile terminal 21 and an in-vehicle device 22 via a network. The communication service server 14 may be a component of the wireless communication server 1.

The wireless communication server 1 includes a database 10, a first communication processing element 11, and a second communication processing element 12. The database 10 may be composed of a database server that is able to communicate with the wireless communication server 1 via a network. Each of the first communication processing element 11 and the second communication processing element 12 is composed of an arithmetic processing apparatus (composed of hardware such as a CPU, a single-core processor and/or a multi-core processor) that reads necessary data and a necessary program (software) from a storage (composed of a memory such as ROM, RAM and EEPROM, and hardware such as SSD and HDD) and then executes arithmetic processing in accordance with the program on the data.

The mobile terminal 21 is composed of a terminal apparatus, such as a smartphone, a tablet terminal apparatus and/or a laptop, having a wireless communication function and being of a size and weight to enable it to be carried by a user into a cabin of a vehicle 2. The mobile terminal 21 includes a mobile input interface 211, a mobile output interface 212, and a mobile control apparatus 214. The mobile input interface 211 may be composed of, for example, a touch panel type button, or a voice recognition apparatus having a microphone. The mobile output interface 212 may be composed of, for example, a display apparatus constituting a touch panel, or a voice output apparatus. The mobile control apparatus 214 is composed of an arithmetic processing apparatus (composed of hardware such as a CPU, a single-core processor and/or a multi-core processor) that reads necessary data and a necessary program (software) from a storage (composed of a memory such as ROM, RAM and EEPROM, and hardware such as SSD and HDD) and then executes arithmetic processing in accordance with the program on the data.

The in-vehicle device 22 is composed of a terminal apparatus mounted in the vehicle 2 and having a wireless communication function. The in-vehicle device 22 includes a vehicle input interface 221, a vehicle output interface 222 and a vehicle control apparatus 224. The vehicle input interface 221 may be composed of, for example, a touch panel type button, or a voice recognition apparatus having a microphone. The vehicle output interface 222 may be composed of, for example, a display apparatus constituting a touch panel, or a voice output apparatus. The vehicle control apparatus 224 is composed of an arithmetic processing apparatus (composed of hardware such as a CPU, a single-core processor and/or a multi-core processor) that reads necessary data and a necessary program (software) from a storage (composed of a memory such as ROM, RAM and EEPROM, and hardware such as SSD and HDD) and then executes arithmetic processing in accordance with the program on the data. The in-vehicle device 22, for example, is put in an ON state by being intermittently supplied with electric power even if the vehicle 2 is in a non-operating state (IGN OFF state), and exhibits its function in the ON state.

The mobile terminal 21 and the in-vehicle device 22 may be able to communicate with each other by a wired communication method or a short-range wireless method such as Bluetooth ("Bluetooth" is a registered trademark).

(Functions)

To facilitate understanding of the functions of the wireless communication system having the above configuration, screen transition in the mobile output interface 212 (or a display apparatus or touch panel constituting the mobile output interface 212) of the mobile terminal 21 is described with reference to FIG. 2.

Figure 2:
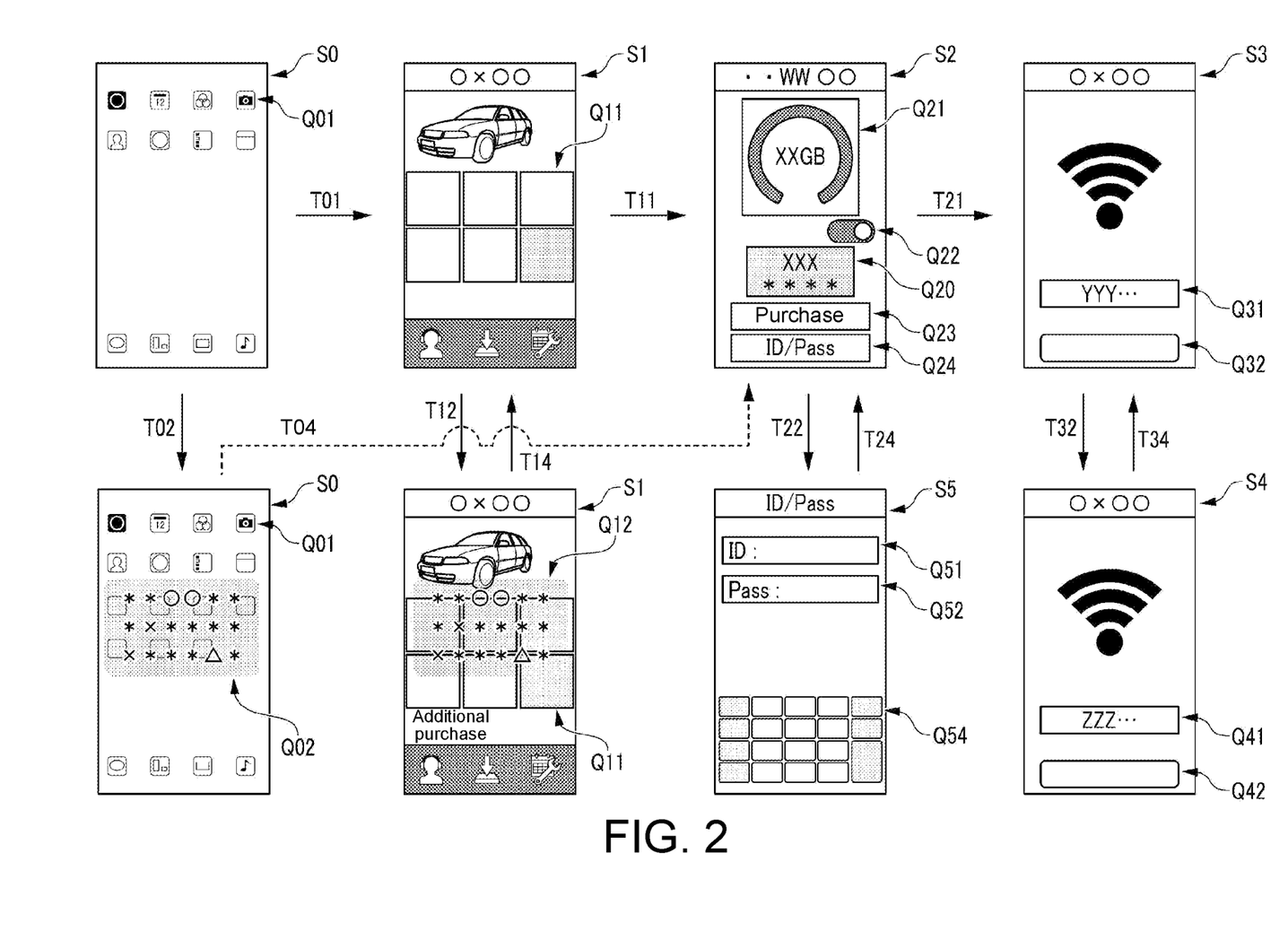
FIG. 2 is an explanatory drawing relating to output screen transition.

In a state in which the mobile terminal 21 has been activated or awakened from sleep, as shown in FIG. 2, a standard designation screen S0 including multiple icons (buttons) Q01 for activating and/or continuing functionality of multiple applications (software) is output by the mobile output interface 212.

While the standard designation screen S0 is output by the mobile output interface 212, if a remaining communication capacity Σ becomes equal to or less than a first threshold Σ1, as shown in FIG. 2, a button Q02 is displayed on the standard designation screen S0 (see arrow T02 in FIG. 2). In the button Q02, for example, a text is displayed indicating insufficiency of available remaining communication capacity and a recommendation to increase the available communication capacity by purchasing a new plan.

By tapping one of the icons Q01 corresponding to an in-vehicle Wi-Fi application ("Wi-Fi" is a registered trademark) on the standard designation screen S0, an output screen in the mobile output interface 212 transitions from the standard designation screen S0 to a first order designation screen S1 (arrow T01 in FIG. 2). For example, as shown in FIG. 2, multiple operation buttons Q11 are displayed on the first order designation screen S1.

While the first order designation screen S1 is output by the mobile output interface 212, if the remaining communication capacity Σ becomes equal to or less than the first threshold Σ1, as shown in FIG. 2, a text box Q12 is displayed on the first order designation screen S1 (see arrow T12 in FIG. 2). In the text box Q12, for example, a text is displayed indicating insufficiency of available remaining communication capacity and a recommendation to increase the available communication capacity by purchasing a new plan. After the text box Q12 is displayed on the first order designation screen S1 for a predetermined period, the text box Q12 disappears and the original first order designation screen S1 is output by the mobile output interface 212 (see arrow T14 in FIG. 2).

By tapping one of the operation buttons Q11 for using an in-vehicle Wi-Fi service on the first order designation screen S1, the output screen in the mobile output interface 212 transitions from the first order designation screen S1 to a second order designation screen S2 (arrow T11 in FIG. 2). For example, as shown in FIG. 2, on the second order designation screen S2, a text box Q20, a remaining communication capacity display image Q21, an ON/OFF button Q22 for switching between starting and stopping the use of in-vehicle Wi-Fi, a purchase button Q23 for purchasing the in-vehicle Wi-Fi service, and an ID/password button Q24 for setting an ID and a password are displayed. In the text box Q20, a text is displayed indicating the content of a Wi-Fi communication plan in use.

In addition, if the button Q02 is displayed on the standard designation screen S0, by tapping the button Q02, the output screen in the mobile output interface 212 directly transitions from the standard designation screen S0 to the second order designation screen S2, and the output of the first order designation screen S1 is omitted (see dashed arrow T04 in FIG. 2). By tapping the text box Q12 as a button, the output screen in the mobile output interface 212 may transition from the first order designation screen S1 to the second order designation screen S2.

By sliding or swiping the ON/OFF button Q22 from an OFF position to an ON position on the second order designation screen S2, in-vehicle Wi-Fi communication of the mobile terminal 21 using the in-vehicle device 22 as a base station is started or resumed.

By tapping the ID/password button Q24 on the second order designation screen S2, the output screen in the mobile output interface 212 transitions from the second order designation screen S2 to a fifth order designation screen S5 (arrow T22 in FIG. 2). For example, as shown in FIG. 2, an ID input field Q51, a password input field Q52, and a keypad Q54 are displayed on the fifth order designation screen S5. By tapping the keypad Q54 or the like, an ID is input to the ID input field Q51 and a password is input to the password input field Q52. After that, the output screen in the mobile output interface 212 transitions from the fifth order designation screen S5 to the second order designation screen S2 (arrow T24 in FIG. 2).

By tapping the purchase button Q23 on the second order designation screen S2, the output screen in the mobile output interface 212 transitions from the second order designation screen S2 to a third order designation screen S3 (arrow T21 in FIG. 2). As shown in FIG. 2, a menu button Q31 and an application button Q32 are displayed on the third order designation screen S3. By tapping the menu button Q31, a list of selectable plans is displayed as a pull-down menu. Further, by tapping one of the plans, the one of the plans is displayed in the menu button Q31.

Each plan is defined by, for example, a communication capacity available per unit period (for example, one month) and/or available period and available total communication capacity of the plan, and a usage fee corresponding to the amount of the communication capacity and/or the length of the available period.

The first communication processing element 11 may recognize a usage history of the in-vehicle Wi-Fi communication service for the mobile terminal 21 based on communication with the communication service server 14, specify a communication service plan corresponding to the usage history of the in-vehicle Wi-Fi communication service, and cause the mobile output interface 212 to output the third order designation screen S3 (wireless communication application screen) including the communication service plan based on communication with the mobile terminal 21. For example, multiple recommended plans in view of the usage history of the in-vehicle Wi-Fi service through the mobile terminal 21 may be displayed in the pull-down menu, or one or more recommended plans may be displayed as a default plan in the menu button Q31.

Through the third order designation screen S3 (wireless communication application screen) output in the mobile terminal 21, one or more suitable communication service plans can be proposed to a user in view of the user's usage history of the communication service. Accordingly, since the user is able to select the most suitable communication service plan, the convenience of the wireless communication service can be improved.

By tapping the application button Q32 on the third order designation screen S3, an application procedure for one plan displayed in the menu button Q31 at that time is executed. Then, the output screen in the mobile output interface 212 transitions from the third order designation screen S3 to a fourth order designation screen S4 (arrow T32 in FIG. 2). For example, as shown in FIG. 2, the fourth order designation screen S4 includes an application completion window Q41 of the in-vehicle Wi-Fi service and a return button Q42. In the application completion window Q41, a text is displayed indicating that the application procedure for the one plan is completed. When the return button Q42 is tapped on the fourth order designation screen S4, the output screen in the mobile output interface 212 transitions from the fourth order designation screen S4 to the third order designation screen S3 (arrow T34 in FIG. 2). A similar return button is also included on other screens.

The first communication processing element 11 causes the designation screens S0 to S4 (corresponding to "second designation screen" or "designation screen") output in the mobile output interface 212 to display a button operable through the mobile input interface 211. Hence, the user is able to perform various operations (such as screen transition, selection, setting, determination, and application) through the button displayed on the second designation screen output in the mobile terminal 21. Accordingly, the convenience of the wireless communication service can be improved.

(First Function (in-Vehicle Wi-Fi ON Function))

An in-vehicle Wi-Fi ON function as a first function of the wireless communication system having the above configuration is described with reference to FIG. 3.

Figure 3:
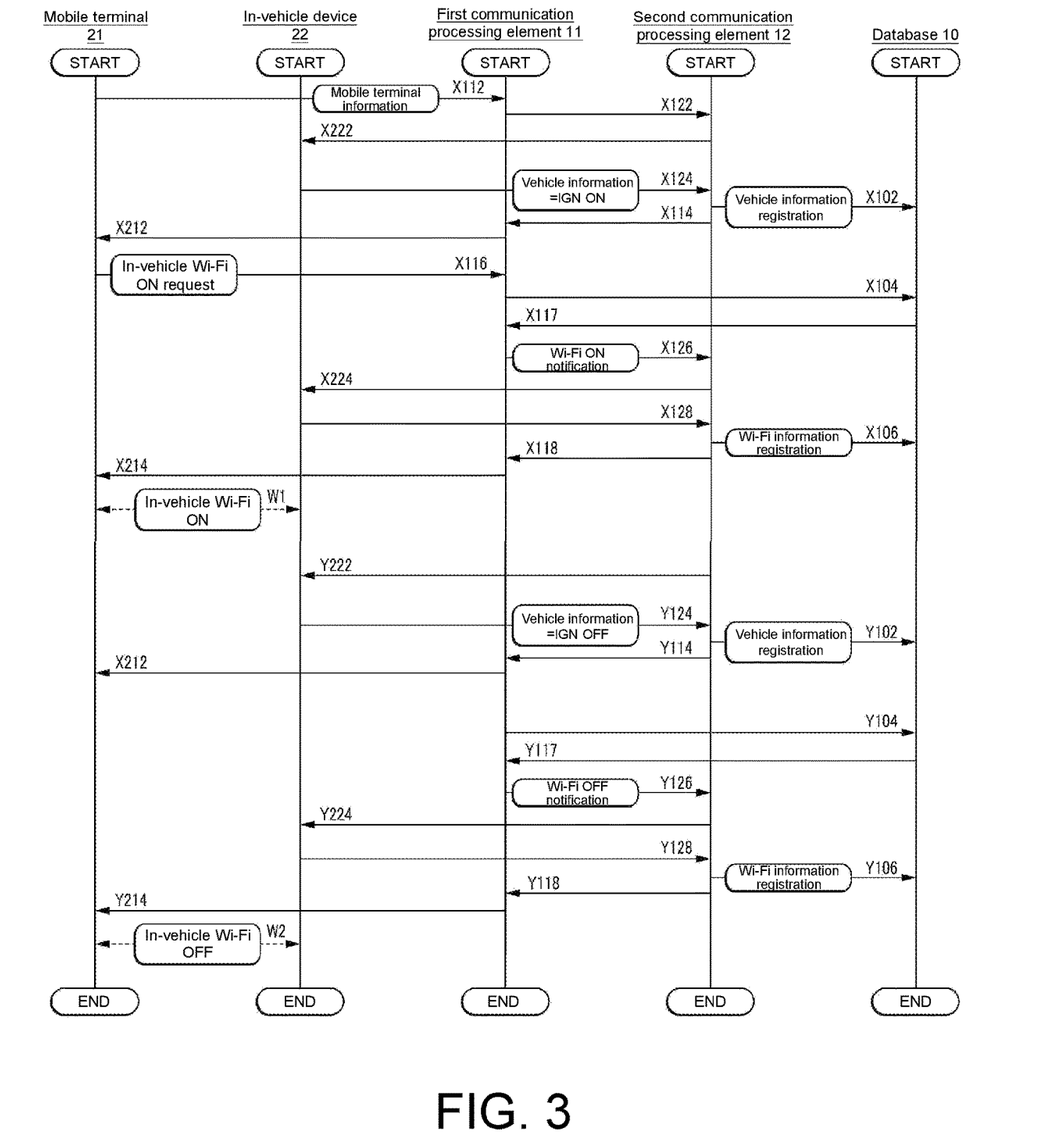
FIG. 3 is a flowchart relating to wireless communication starting processing and wireless communication stopping processing.

In response to that the mobile terminal 21 is brought inside the vehicle 2 by the user and is activated or awakened from sleep, mobile terminal information is transmitted from the mobile terminal 21 to the first communication processing element 11, and is received by the first communication processing element 11 (arrow X112 in FIG. 3). The "mobile terminal information" includes a mobile terminal identifier for identifying the mobile terminal 21 and/or a user identifier for identifying the user. In response thereto, the standard designation screen S0 as shown in FIG. 2 is output by the mobile output interface 212.

Subsequently, the mobile terminal information is transmitted to the second communication processing element 12 by the first communication processing element 11, and is received by the second communication processing element 12 (arrow X122 in FIG. 3). Further, a vehicle information request is transmitted to the in-vehicle device 22 by the second communication processing element 12, and is received by the in-vehicle device 22 (arrow X222 in FIG. 3).

Vehicle information is acquired and transmitted to the second communication processing element 12 by the in-vehicle device 22, and is received by the second communication processing element 12 (arrow X124 in FIG. 3). The "vehicle information" includes, in addition to a vehicle identifier for identifying the vehicle 2 and/or an in-vehicle device identifier for identifying the in-vehicle device 22, information indicating a state of the vehicle 2, such as an operating state (IGN ON state) in which the vehicle 2 is able to travel and a non-operating state (IGN OFF state) in which the vehicle 2 is unable to travel. The vehicle information is transmitted to the database 10 by the second communication processing element 12, and the vehicle information is registered in the database 10 (arrow X102 in FIG. 3). At this time, the mobile terminal information and the vehicle information are stored in association with each other in the database 10.

If the vehicle information includes information indicating that the vehicle 2 has transitioned from the IGN OFF state to the IGN ON state as a result of the user switching an IGN switch (an energization switch in the case of an electric car) of the vehicle 2 from OFF to ON, the vehicle information is transmitted to the first communication processing element 11 by the second communication processing element 12, and is received by the first communication processing element 11 (arrow X114 in FIG. 3). An application activation notification is transmitted to the mobile terminal 21 by the first communication processing element 11, and is received by the mobile terminal 21 (arrow X212 in FIG. 3). In response thereto, an application for the in-vehicle Wi-Fi service is activated in the mobile terminal 21, and the first order designation screen S1 (application top screen) as shown in FIG. 2 is output by the mobile output interface 212.

In response to an activation instruction operation (for example, a first designation operation) on the mobile terminal 21, the first communication processing element 11 may activate the in-vehicle device 22 or a Wi-Fi application for an in-vehicle device based on communication with the second communication processing element 12. In response to that the activation instruction operation is performed on the mobile terminal 21 and the vehicle 2 is switched from the IGN OFF state to the IGN ON state in the state in which the mobile terminal 21 has been activated, the mobile terminal 21 is able to start using wireless communication via a network using the in-vehicle device 22 as the base station. Accordingly, the convenience of the wireless communication service can be improved.

In response to that the first designation operation is performed through the mobile input interface 211, an in-vehicle Wi-Fi ON request (wireless communication ON request) is transmitted from the mobile terminal 21 to the first communication processing element 11, and is received by the first communication processing element 11 (arrow X116 in FIG. 3). For example, a tapping operation on one operation button Q11 on the first order designation screen S1 shown in FIG. 2 corresponds to the first designation operation. The in-vehicle Wi-Fi ON request includes the mobile terminal identifier for identifying the mobile terminal 21 and/or the user identifier for identifying the user.

By the first communication processing element 11, the mobile terminal identifier and/or the user identifier included in the in-vehicle Wi-Fi ON request and the vehicle identifier and/or the in-vehicle device identifier included in the vehicle information are transmitted to the database 10 for inquiry (arrow X104 in FIG. 3). Presence or absence of registration of the mobile terminal information matching the identifier and the vehicle information indicating that the vehicle 2 is in the IGN ON state is transmitted as an inquiry result to the first communication processing element 11 by the database 10, and the inquiry result is received by the first communication processing element 11 (arrow X117 in FIG. 3).

If the inquiry result is that the mobile terminal information and the vehicle information indicating that the vehicle 2 is in the IGN ON state have been registered in the database 10, a Wi-Fi ON notification (communication permission notification) is transmitted to the second communication processing element 12 by the first communication processing element 11, and is received by the second communication processing element 12 (arrow X126 in FIG. 3). In response thereto, the Wi-Fi ON notification is transmitted to the in-vehicle device 22 by the second communication processing element 12, and is received by the in-vehicle device 22 (arrow X224 in FIG. 3). Accordingly, the in-vehicle device 22 is in a state able to function as a base station of the in-vehicle Wi-Fi (in-vehicle wireless communication service) for the mobile terminal 21.

In-vehicle device information is transmitted to the second communication processing element 12 by the in-vehicle device 22, and is received by the second communication processing element 12 (arrow X128 in FIG. 3). The in-vehicle device information includes, in addition to the vehicle identifier and/or the in-vehicle device identifier, information indicating that the in-vehicle device 22 is in the state able to function as a Wi-Fi base station.

The in-vehicle device information is transmitted to the database 10 by the second communication processing element 12, and is registered in the database 10 (arrow X106 in FIG. 3). At this time, the in-vehicle device information is stored in association with the mobile terminal information and the vehicle information in the database 10.

The in-vehicle device information and/or information corresponding thereto is transmitted to the first communication processing element 11 by the second communication processing element 12, and is received by the first communication processing element 11 (arrow X118 in FIG. 3). In response thereto, the aforementioned information is transmitted to the mobile terminal 21 by the first communication processing element 11, and is received by the mobile terminal 21 (arrow X214 in FIG. 3). Further, for example, the second order designation screen S2 (Wi-Fi top screen) as shown in FIG. 2 is output by the mobile output interface 212.

In response to that a second designation operation (in-vehicle Wi-Fi use starting operation) is performed on the mobile terminal 21 through the mobile input interface 211, a Wi-Fi communication service using the in-vehicle device 22 as the base station is provided for the mobile terminal 21 (two way arrow W1 in FIG. 3). For example, a swiping operation on the ON/OFF button Q22 from the OFF position to the ON position on the second order designation screen S2 shown in FIG. 2 corresponds to the second designation operation.

(Second Function (in-Vehicle Wi-Fi OFF Function))

An in-vehicle Wi-Fi OFF function as a second function of the wireless communication system having the above configuration is described with reference to FIG. 3.

The vehicle information request is transmitted to the in-vehicle device 22 by the second communication processing element 12, and is received by the in-vehicle device 22 (arrow Y222 in FIG. 3).

The vehicle information is acquired and transmitted to the second communication processing element 12 by the in-vehicle device 22, and is received by the second communication processing element 12 (arrow Y124 in FIG. 3). The vehicle information is registered in the database 10 (arrow Y102 in FIG. 3). At this time, the mobile terminal information and the vehicle information are stored in association with each other in the database 10.

If the vehicle information includes information indicating that the vehicle 2 has transitioned from the IGN ON state to the IGN OFF state, the vehicle information is transmitted to the first communication processing element 11 by the second communication processing element 12, and is received by the first communication processing element 11 (arrow Y114 in FIG. 3). The vehicle information and/or information corresponding thereto is transmitted to the mobile terminal 21 by the first communication processing element 11, and is received by the mobile terminal 21 (arrow X212 in FIG. 3). In response thereto, a screen including an advance notice that the Wi-Fi service is to be stopped may be output by the mobile output interface 212. For example, in the case where the second order designation screen S2 shown in FIG. 2 is output by the mobile output interface 212, automatic swiping of the ON/OFF button Q22 from the ON position to the OFF position may correspond to the advance notice.

By the first communication processing element 11, the vehicle identifier and/or the in-vehicle device identifier included in the vehicle information is transmitted to the database 10 for inquiry (arrow Y104 in FIG. 3). Presence or absence of registration of the vehicle information indicating that the vehicle 2 matching the identifier is in the IGN OFF state is transmitted as an inquiry result to the first communication processing element 11 by the database 10, and the inquiry result is received by the first communication processing element 11 (arrow Y117 in FIG. 3).

If the inquiry result is that the vehicle information indicating that the vehicle 2 is in the IGN OFF state has been registered in the database 10, a Wi-Fi OFF notification (communication stop notification) is transmitted to the second communication processing element 12 by the first communication processing element 11, and is received by the second communication processing element 12 (arrow Y126 in FIG. 3). In response thereto, the Wi-Fi OFF notification is transmitted to the in-vehicle device 22 by the second communication processing element 12, and is received by the in-vehicle device 22 (arrow Y224 in FIG. 3). Accordingly, the in-vehicle device 22 is in a state in which its function as the base station of the in-vehicle Wi-Fi (in-vehicle wireless communication service) for the mobile terminal 21 is stopped.

The in-vehicle device information is transmitted to the second communication processing element 12 by the in-vehicle device 22, and is received by the second communication processing element 12 (arrow Y128 in FIG. 3).

The in-vehicle device information is transmitted to the database 10 by the second communication processing element 12, and is registered in the database 10 (arrow Y106 in FIG. 3). At this time, the in-vehicle device information is stored in association with the mobile terminal information and the vehicle information in the database 10.

The in-vehicle device information and/or information corresponding thereto is transmitted to the first communication processing element 11 by the second communication processing element 12, and is received by the first communication processing element 11 (arrow Y118 in FIG. 3). In response thereto, the aforementioned information is transmitted to the mobile terminal 21 by the first communication processing element 11, and is received by the mobile terminal 21 (arrow Y214 in FIG. 3). Then, in response thereto, for example, the first order designation screen S1 as shown in FIG. 2 is output by the mobile output interface 212, and a notification that the in-vehicle Wi-Fi service is stopped is displayed on the first order designation screen S1. Further, the Wi-Fi communication service for the mobile terminal 21 using the in-vehicle device 22 as the base station is stopped (two way arrow W2 in FIG. 3).

(Third Function (Remaining Communication Capacity Display Function))

A remaining communication capacity display function as a third function of the wireless communication system having the above configuration is described with reference to FIG. 4.

Figure 4:
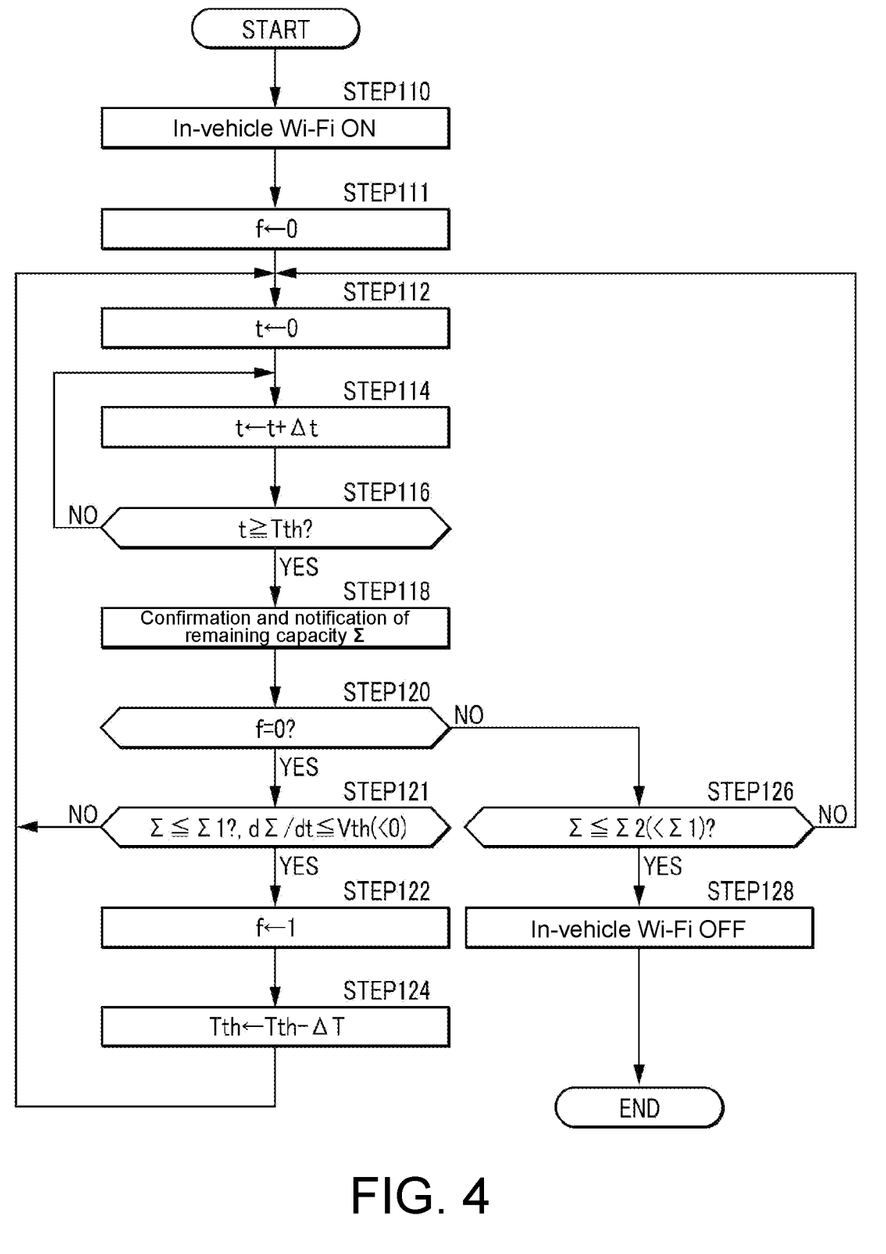
FIG. 4 is a flowchart relating to monitoring processing of a remaining communication capacity.

It is recognized by the second communication processing element 12 based on communication with the in-vehicle device 22 that the in-vehicle Wi-Fi is in the ON state (STEP110 in FIG. 4 (see arrows X126, X118 and two way arrow W1 in FIG. 3)).

A value of a flag f indicating the length of a designated period Tth is reset to "0" (STEP111 in FIG. 4). A counted time t counted by a timer is reset to "0" (STEP112 in FIG. 4). The counted time t is increased by "Δt" corresponding to an arithmetic processing period (STEP114 in FIG. 4). It is determined whether the counted time t is equal to or more than the designated period Tth (for example, "10 minutes") (STEP116 in FIG. 4). If a result of the determination is negative (NO in STEP116 in FIG. 4), the counted time t is further increased by Δt (STEP114 in FIG. 4).

If a result of the determination is affirmative (YES in STEP116 in FIG. 4), by the first communication processing element 11, the remaining communication capacity Σ of the communication service in the mobile terminal 21 with respect to the communication service server 14 is confirmed, and a result of the confirmation is transmitted to the mobile terminal 21, thereby causing the mobile output interface 212 to display the remaining communication capacity Σ (STEP118 in FIG. 4). Accordingly, for example, as shown in FIG. 2, the second order designation screen S2, which includes the remaining communication capacity display image Q21 in which the remaining communication capacity Σ is written and the amount of the remaining communication capacity Σ is expressed by the length of an arc-shaped icon, is output by the mobile output interface 212.

Subsequently, it is determined by the second communication processing element 12 whether the value of the flag f is 0 (STEP120 in FIG. 4). As will be described later, in a state in which the value of the flag f is not set to "1", since a result of the determination will be affirmative (YES in STEP120 in FIG. 4), it is determined by the second communication processing element 12 whether the remaining communication capacity Σ is equal to or less than a first threshold Σ1 and a change rate (dΣ/dt) thereof is equal to or less than a reference rate Vth (<0) (STEP121 in FIG. 4). The determination processing regarding the change rate (dΣ/dt) of the remaining communication capacity Σ may be omitted. The reference rate Vth is set to a value so that the remaining communication capacity Σ may then become 0 (Σ−Vth×Tth becomes 0 or less) if decreasing at the reference rate Vth until the designated period Tth elapses.

If a result of the determination is negative (NO in STEP121 in FIG. 4), that is, if the probability of the remaining communication capacity Σ becoming 0 in a relatively short period (for example, a period of Tth to 3Tth)

is low, the counted time t counted by the timer is reset to 0 (STEP112 in FIG. 4), and the subsequent processing is repeated.

On the other hand, if a result of the determination is affirmative (YES in STEP121 in FIG. 4), that is, if the probability of the remaining communication capacity $\Sigma$ becoming 0 in a relatively short period is high, the value of the flag f is set to "1" by the second communication processing element 12 (STEP122 in FIG. 4), and the designated period Tth is set shorter by $\Delta T$ (for example, $\Delta T=5$ minutes, 7 minutes or 9 minutes) (STEP124 in FIG. 4). Then, the counted time t counted by the timer is reset to 0 (STEP112 in FIG. 4), and the subsequent processing is repeated.

If it is determined that the remaining communication capacity $\Sigma$ is likely to become 0 in a short period in the state in which the standard designation screen S0 is output by the mobile output interface 212, the button Q02 including a notification that the remaining communication capacity is insufficient may be displayed on the standard designation screen S0 (see arrow T02 in FIG. 2). If it is determined that the remaining communication capacity $\Sigma$ is likely to become 0 in a short period in the state in which the first order designation screen S1 is output by the mobile output interface 212, the text box Q12 including a notification that the remaining communication capacity is insufficient may be displayed on the first order designation screen S1 (see arrow T12 in FIG. 2).

In a state in which the value of the flag f is set to "1", since a result of the determination of whether the value of the flag f is 0 will be negative (NO in STEP120 in FIG. 4), it is determined by the second communication processing element 12 whether the remaining communication capacity $\Sigma$ is equal to or less than a second threshold $\Sigma 2$ (smaller than the first threshold $\Sigma 1$) (STEP126 in FIG. 4).

If a result of the determination is negative (NO in STEP126 in FIG. 4), the counted time t counted by the timer is reset to 0 (STEP112 in FIG. 4), and the subsequent processing is repeated. On the other hand, if a result of the determination is affirmative (YES in STEP126 in FIG. 4), the in-vehicle Wi-Fi is turned off, that is, the Wi-Fi communication through the mobile terminal 21 using the in-vehicle device 22 as the base station is stopped (STEP128 in FIG. 4).

According to the third function, the remaining communication capacity $\Sigma$ displayed on the second order designation screen S2 (corresponding to "first designation screen") output in the mobile terminal 21 is periodically updated. Hence, the user is able to grasp time-series change modes of the remaining communication capacity E.

The designated period Tth being a confirmation period of the remaining communication capacity $\Sigma$ may be set to an appropriate length in view of the user's usage history of the communication service. For example, for a heavy user who consumes communication capacity in a short time, the designated period Tth may be set shorter than that of a standard user. Accordingly, the convenience of the wireless communication service can be improved.

(Fourth Function (in-Vehicle Wi-Fi Use Starting Function))

An in-vehicle Wi-Fi use starting function as a fourth function of the wireless communication system having the above configuration is described with reference to FIG. 5.

Figure 5:
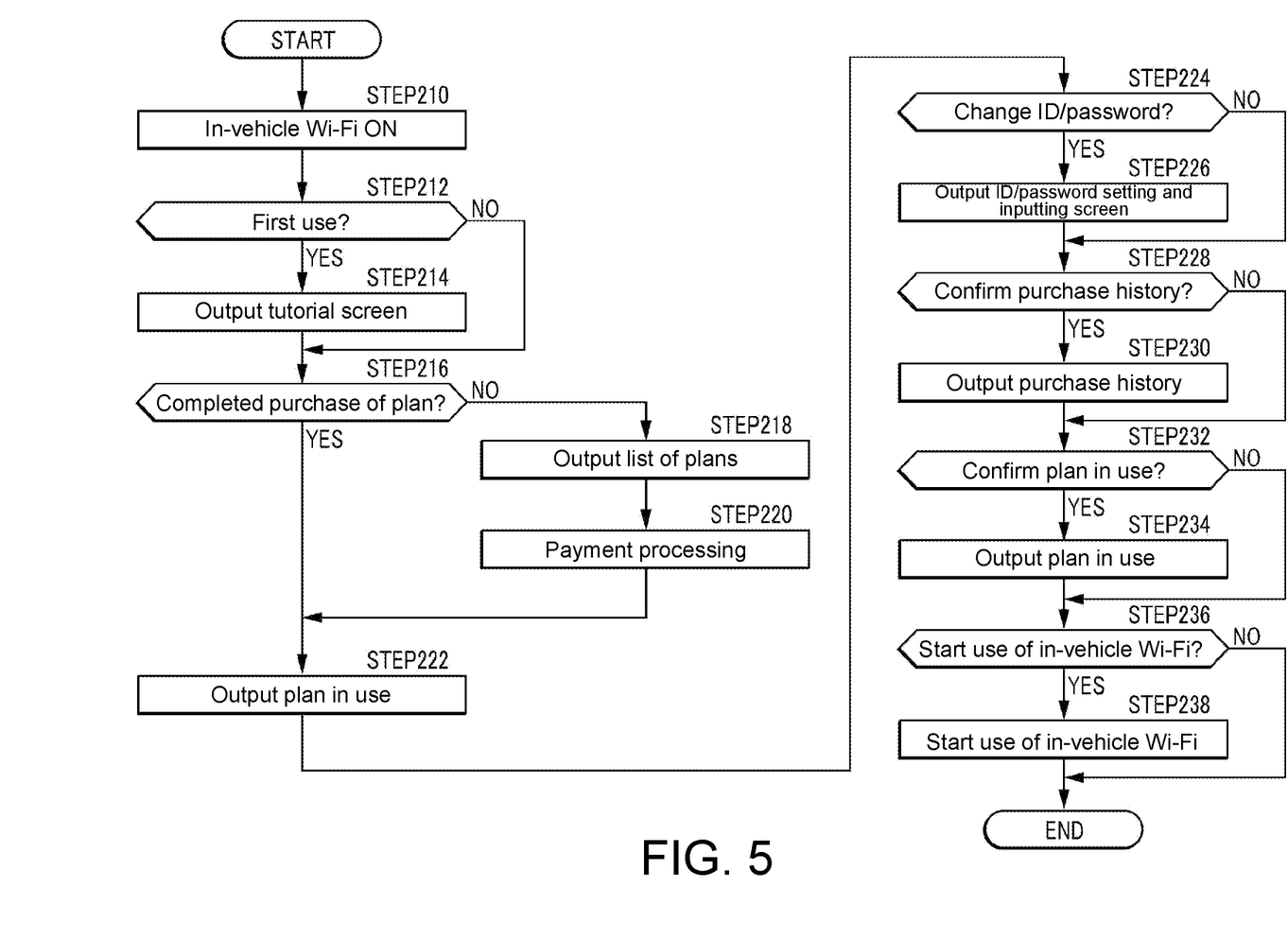
FIG. 5 is a flowchart relating to in-vehicle Wi-Fi use starting processing.

It is recognized by the second communication processing element 12 based on communication with the in-vehicle device 22 that the in-vehicle Wi-Fi is in the ON state, that is, the Wi-Fi communication through the mobile terminal 21 using the in-vehicle device 22 as the base station is permitted (STEP210 in FIG. 5).

It is determined by the first communication processing element 11 whether a use of the in-vehicle Wi-Fi in the mobile terminal 21 is the first use (STEP212 in FIG. 5).

If it is determined that the use of the in-vehicle Wi-Fi in the mobile terminal 21 is the first use (YES in STEP212 in FIG. 5), by the first communication processing element 11 based on communication with the mobile terminal 21, a tutorial screen is output by the mobile output interface 212 (STEP214 in FIG. 5). The tutorial screen includes guidelines such as how to use the in-vehicle Wi-Fi. Moreover, it is determined by the first communication processing element 11 whether a purchase procedure for any one of multiple plans for using the in-vehicle Wi-Fi has been completed (STEP216 in FIG. 5).

For example, as described above, by tapping the application button Q32 on the third order designation screen S3 shown in FIG. 2, the application procedure for one plan displayed in the menu button Q31 at that time is executed. At this time, the application procedure for the one plan is executed based on the communication between the first communication processing element 11 and/or the second communication processing element 12 and the communication service server 14. The plan for which the application for starting use was made is registered in association with the mobile terminal identifier and/or the user identifier in the database 10.

If it is determined that this is the second or greater time the in-vehicle Wi-Fi is used in the mobile terminal 21 (NO in STEP212 in FIG. 5), the output of the tutorial screen (STEP214 in FIG. 5) is omitted, and it is determined by the first communication processing element 11 whether the purchase procedure for any one of the multiple plans for using the in-vehicle Wi-Fi has been completed (STEP216 in FIG. 5).

If it is determined that the purchase procedure for the plan has been completed (YES in STEP216 in FIG. 5), by the first communication processing element 11 based on communication with the mobile terminal 21, a plan being used by the user is output by the mobile output interface 212 (STEP222 in FIG. 5). Accordingly, as shown in FIG. 2, the text box Q20 showing a text that indicates the content of the plan in use is displayed on the second order designation screen S2.

If it is determined that the purchase procedure for the plan has not been completed (NO in STEP216 in FIG. 5), by the first communication processing element 11 based on communication with the mobile terminal 21, a list of plans available is output by the mobile output interface 212 (STEP218 in FIG. 5). Accordingly, for example, as shown in FIG. 2, the third order designation screen S3 on which one or more recommended plans are displayed as the default plan in the menu button Q31 is output by the mobile output interface 212.

After that, if a plan is selected through the mobile input interface 211 and a necessary fee payment procedure for using the plan is completed (STEP220 in FIG. 5), by the first communication processing element 11 based on communication with the mobile terminal 21, the plan being used by the user is output by the mobile output interface 212 (STEP222 in FIG. 5). The plan of the in-vehicle Wi-Fi service in use is registered in association with the mobile terminal identifier and/or the user identifier in the database 10. Accordingly, for example, as shown in FIG. 2, the text box Q20 showing a text that indicates the content of the plan in use is displayed on the second order designation screen S2.

It is determined by the first communication processing element 11 based on communication with the mobile terminal 21 whether an ID (user identifier) and password setting request has been made through the mobile input interface 211 (STEP224 in FIG. 5). If it is determined that an ID and password setting request has been made (YES in STEP224 in FIG. 5), based on communication with the mobile terminal 21, a screen for setting and inputting an ID and password is output by the mobile output interface 212 (STEP226 in FIG. 5). Accordingly, for example, the fifth order designation screen S5 as shown in FIG. 2 is output by the mobile output interface 212.

If it is determined that no ID and password setting request has been made (NO in STEP224 in FIG. 5), or alternatively, subsequent to the output of the screen for setting and inputting the ID and password (STEP226 in FIG. 5), it is determined by the first communication processing element 11 based on communication with the mobile terminal 21 whether a purchase history confirmation operation has been performed through the mobile input interface 211 (STEP228 in FIG. 5). If it is determined that a purchase history confirmation operation has been performed (YES in STEP228 in FIG. 5), based on communication with the mobile terminal 21, a screen showing an application history of the in-vehicle Wi-Fi service plan is output (STEP230 in FIG. 5). The application history of the in-vehicle Wi-Fi service plan is registered in association with the mobile terminal identifier and/or the user identifier in the database 10.

If it is determined that no purchase history confirmation operation has been performed (NO in STEP228 in FIG. 5), or alternatively, subsequent to the output of the screen showing the application history of the in-vehicle Wi-Fi service plan (STEP230 in FIG. 5), it is determined by the first communication processing element 11 based on communication with the mobile terminal 21 whether a plan-in-use confirmation operation has been performed through the mobile input interface 211 (STEP232 in FIG. 5). If a result of the determination is affirmative (YES in STEP232 in FIG. 5), based on communication with the mobile terminal 21, a screen showing a plan in use in the in-vehicle Wi-Fi service is output (STEP234 in FIG. 5). Accordingly, for example, as shown in FIG. 2, the text box Q20 showing a text that indicates the content of the plan in use is displayed on the second order designation screen S2.

Next, it is determined by the first communication processing element 11 based on communication with the mobile terminal 21 whether an in-vehicle Wi-Fi use starting operation has been performed through the mobile input interface 211 (STEP236 in FIG. 5). For example, a swiping operation on the ON/OFF button Q22 displayed on the second order designation screen S2 shown in FIG. 2 from the OFF position to the ON position corresponds to the in-vehicle Wi-Fi use starting operation.

If it is determined that an in-vehicle Wi-Fi use starting operation has been performed (YES in STEP236 in FIG. 5), the use of the in-vehicle Wi-Fi service through the mobile terminal 21 using the in-vehicle device 22 as the base station is started (STEP238 in FIG. 5).

If it is determined that no in-vehicle Wi-Fi use starting operation has been performed (NO in STEP236 in FIG. 5), a series of processing is ended.

(Effects)

According to the wireless communication system 1 having the above configuration, in response to the vehicle 2 being switched from the IGN OFF state (non-operating state) to the IGN ON state (operating state) in the state in which the mobile terminal 21 has been activated, the use of wireless communication (Wi-Fi communication) by the mobile terminal 21 via the network using the in-vehicle device 22 as the base station can be started (see FIG. 3). In response to the vehicle 2 being switched from the IGN ON state (operating state) to the IGN OFF state (non-operating state) in the state in which the mobile terminal 21 has been activated, the use of wireless communication (Wi-Fi communication) by the mobile terminal 21 via the network using the in-vehicle device 22 as the base station is stopped. Accordingly, the convenience of the wireless communication service can be improved. In addition, since a Wi-Fi network is available in a certain area close to a vehicle, Wi-Fi can be used in a place such as outdoors without depending on a Wi-Fi router or a power supply of the mobile terminal 21.

OTHER EMBODIMENTS OF DISCLOSURE

The second communication processing element 12 may confirm presence or absence of an abnormality in the in-vehicle Wi-Fi communication of the mobile terminal 21 based on communication with the communication service server 14; if the presence of the abnormality is confirmed, the second communication processing element 12 may confirm a provision status of the in-vehicle Wi-Fi communication service based on communication with the communication service server 14. For example, the second communication processing element 12 periodically sends a request for confirming a provision status of the wireless communication service to the communication service server 14, and if a confirmation result has not returned from the communication service server 14 to the second communication processing element 12 for more than a predetermined period, it is determined that an abnormality has occurred in the in-vehicle Wi-Fi communication.

According to the wireless communication system having the above configuration, if an abnormality has occurred in the in-vehicle Wi-Fi communication (wireless communication service) by the communication service server 14, that is, if a problem has occurred in the Wi-Fi communication (in-vehicle Wi-Fi communication) by the mobile terminal 21 using the in-vehicle device 22 as the base station, a situation is confirmed based on communication with the communication service server 14. Accordingly, since a cause of the abnormality can be investigated and/or eliminated in the communication service server 14, the convenience of the wireless communication service can be improved.

If it is confirmed that the abnormality in the in-vehicle Wi-Fi communication by the mobile terminal 21 has been eliminated, the second communication processing element 12 may coordinate the content of the communication service by the communication service server 14 for the mobile terminal 21 included in the mobile terminal information registered in the database 10 with the content of the communication service managed by the communication service server 14. For example, in response to that the second communication processing element 12 periodically sends the request for confirming the provision status of the wireless communication service to the communication service server 14, if the confirmation result is periodically returned from the communication service server 14 to the second communication processing element 12, it is determined that the abnormality in the in-vehicle Wi-Fi communication has been eliminated.

According to the wireless communication system having the above configuration, if the abnormality in the Wi-Fi communication by the mobile terminal 21 using the in-vehicle device 22 as the base station is eliminated, the content of the communication service registered in the database 10 regarding the mobile terminal 21 and the content of the communication service by the communication service server 14 can be coordinated. Accordingly, the occurrence of inconsistency in the content of the communication service before and after the occurrence of an abnormality in the in-vehicle Wi-Fi communication by the mobile terminal 21 is prevented, and thus, the convenience of the wireless communication service can be improved.

If it is confirmed that the abnormality in the Wi-Fi communication by the mobile terminal 21 using the in-vehicle device 22 as the base station is eliminated, the second communication processing element 12 may update the mobile terminal information and the vehicle information registered in the database 10 by mutual communication between the first communication processing element 11, the second communication processing element 12, the in-vehicle device 22, and the communication service server 14.

According to the wireless communication system having the above configuration, if the abnormality in the Wi-Fi communication by the mobile terminal 21 using the in-vehicle device 22 as the base station is eliminated, the mobile terminal information and the vehicle information registered in the database 10 are updated or refreshed. Accordingly, the occurrence of inconsistency between the latest registered content and the actual content of the mobile terminal information and/or the vehicle information before and after the occurrence of an abnormality in the in-vehicle Wi-Fi communication by the mobile terminal 21 is prevented, and thus, the convenience of the wireless communication service can be improved.

Each of the designation screens (or second designation screens) S0 to S5 as shown in FIG. 2 may be output by the vehicle output interface 222 of the in-vehicle device 22 instead of the mobile terminal 21. In this case, by the buttons displayed on the designation screens S0 to S5, the user is able to perform various operations (such as screen transition, selection, setting, determination, and application) through the vehicle input interface 221. Accordingly, the convenience of the wireless communication service can be improved.

What is claimed is:

1. A wireless communication system, comprising:
   a database;
   a first communication processing element; and
   a second communication processing element, which connects to the first communication processing element, wherein
   a wireless communication state via a network of a mobile terminal that uses an in-vehicle device mounted in a vehicle as a base station is controlled by cooperation between the database, the first communication processing element and the second communication processing element,
   wherein the wireless communication state indicates whether the mobile terminal is connected to the in-vehicle device or not;
   the first communication processing element receives mobile terminal information regarding a state of the mobile terminal from the mobile terminal, and then transmits the mobile terminal information to the second communication processing element;
   the second communication processing element, on condition that the mobile terminal information indicating that the mobile terminal is activated has been received from the first communication processing element, receives vehicle information regarding a state of the vehicle from the in-vehicle device, and then transmits the vehicle information to the first communication processing element, and registers the vehicle information in the database;
   the first communication processing element, on condition that the vehicle information indicating that the vehicle is switched from a non-operating state to an operating state has been received from the second communication processing element, determines whether the same vehicle information has been registered in the database, and, on condition that a result of the determination is affirmative, transmits a communication permission notification to the second communication processing element;
   the second communication processing element, on condition that the communication permission notification has been received from the first communication processing element, causes the in-vehicle device to function as the base station based on the communication with the in-vehicle device.

2. The wireless communication system according to claim 1, wherein
   the first communication processing element, on condition that the vehicle information indicating that the vehicle is switched from the operating state to the non-operating state has been received from the second communication processing element, determines whether the same vehicle information has been registered in the database, and, on condition that a result of the determination is affirmative, transmits a communication stop notification to the second communication processing element;
   the second communication processing element, on condition that the communication stop notification has been received from the first communication processing element, stops the function of the in-vehicle device as the base station based on the communication with the in-vehicle device.

3. The wireless communication system according to claim 1, wherein
   the second communication processing element confirms presence or absence of an abnormality in communication of the mobile terminal via the network based on communication with a communication service server, and upon confirming the presence of the abnormality, confirms a provision status of a communication service for the mobile terminal via the network based on the communication with the communication service server.

4. The wireless communication system according to claim 3, wherein the second communication processing element, upon confirming that the abnormality in communication of the mobile terminal via the network is eliminated, coordinates content of the communication service by the communication service server for the mobile terminal comprised in the mobile terminal information registered in the database with content of the communication service managed by the communication service server.

5. The wireless communication system according to claim 1, wherein the second communication processing element, upon confirming that an abnormality in communication of the mobile terminal via the network is eliminated, updates the mobile terminal information and the vehicle information registered in the database by mutual communication between the first communication processing element, the second communication processing element, the in-vehicle device, and a communication service server.

6. The wireless communication system according to claim 1, wherein the database stores and retains the mobile terminal information comprising at least one of a mobile terminal identifier for identifying the mobile terminal and a user identifier for identifying a user of the mobile terminal in association with the vehicle information comprising at least one of a vehicle identifier for identifying the vehicle and an in-vehicle device identifier for identifying the in-vehicle device.

\* \* \* \* \*